United States Patent
Badger et al.

[11] Patent Number: 5,978,501
[45] Date of Patent: Nov. 2, 1999

[54] ADAPTIVE INSPECTION METHOD AND SYSTEM

[75] Inventors: Karen Marie Dusablon Badger, Milton; Brian Joseph Grenon, Colchester; David Shawn O'Grady; Jacek Grzegorz Smolinski, both of Jericho, all of Vt.

[73] Assignee: International Business Machines Corporation, Armonk, N.Y.

[21] Appl. No.: 08/778,466

[22] Filed: Jan. 3, 1997

[51] Int. Cl.[6] .................................................. G06K 9/00
[52] U.S. Cl. ............................................ 382/144; 382/224
[58] Field of Search ..................... 382/149, 222, 382/151, 141, 100, 142, 143, 144, 145, 146, 147, 148, 150, 152, 153, 181, 190, 195, 201, 203, 209, 217, 224, 275, 282, 308; 348/130; 356/394; 364/489, 578; 371/22.1; 702/117; 706/919

[56] References Cited

U.S. PATENT DOCUMENTS

| | | | |
|---|---|---|---|
| 4,079,416 | 3/1978 | Faani et al. | 358/106 |
| 4,477,926 | 10/1984 | Linger et al. | 382/8 |
| 4,481,664 | 11/1984 | Linger et al. | 382/8 |
| 4,555,798 | 11/1985 | Broadbent, Jr. et al. | 382/8 |
| 4,928,313 | 5/1990 | Leonard et al. | 382/8 |
| 4,984,282 | 1/1991 | Manns et al. | 382/8 |
| 5,119,434 | 6/1992 | Bishop et al. | 382/8 |
| 5,129,009 | 7/1992 | Lebeau et al. | 382/8 |
| 5,371,690 | 12/1994 | Engel et al. | 382/151 |
| 5,381,417 | 1/1995 | Loopik et al. | 371/151 |

FOREIGN PATENT DOCUMENTS

| | | | |
|---|---|---|---|
| 5-142158 | 6/1993 | Japan | G01N 21/88 |
| 6-185999 | 7/1994 | Japan | G01B 11/24 |

*Primary Examiner*—Bijan Tadayon
*Attorney, Agent, or Firm*—Schemiser, Olsen & Watts; James A. Leas

[57] ABSTRACT

A method and system for detecting defects in the design of a photolithographic mask or a printed wafer. It derives an adaptive inspection algorithm that allows for a tighter inspection of a mask to a data set which has repeatable differences. The inspection should allow flexibility to remove un-important differences while maintaining a tight inspection capability.

18 Claims, 5 Drawing Sheets

ADAPTIVE INSPECTION METHOD AND SYSTEM

BACKGROUND OF THE INVENTION

1. Technical Field

The present invention relates to optical lithography systems. More particularly, this invention relates to a method and system for inspecting a mask or printed wafer for defects.

2. Background Art

Since the beginning of the computer era, manufacturers in the field of integrated circuits (IC's) have sought to reduce the geometric size of the devices (e.g., transistors or polygates) present on integrated circuits. The benefits achieved in reducing device dimensions include higher performance in smaller packaging sizes. However, numerous limitations arise as manufacturers attempt to achieve smaller and smaller device sizes. One primary problem manufacturers face is that as smaller devices are sought, the precision required from the tools used to create IC devices increases beyond their capabilities. Given the prohibitive costs involved and potential time lost to wait for the next generation of tools, manufacturers are forced to find techniques and methods that will allow such tools to operate beyond their intended specifications.

One of the first steps in manufacturing integrated circuit chips involves the laying or designing of the circuits to be packaged on a chip. Most ICs arc designed using computer aided design (CAD) layout tools. CAD tools allow chip manufacturers to plan the layout of the circuits on a computer where they can be analyzed and stored. Once this step is finished, the designs need to be transferred onto the chip. Unfortunately, present day chip manufacturing tools often lack the capability to create increasingly complicated and compact IC chips.

The predominate method of creating devices on IC chips involves the use of masks (Note that plates and masking plates will also be used in the following discussion to refer to masks). In general, masks typically comprise a transparent substrate on which various "circuit" patterns, determined by a CAD system, are disposed. That "circuit" pattern is then transferred onto the surface of a silicon wafer. The transfer of the pattern from the mask to the silicon substrate is accomplished by passing visible, ultraviolet, or even x-ray radiation (e.g., light) through the mask and onto a silicon substrate containing a photoresist material. Because the mask contains a pattern made up of solid lines and clear space, only those areas made up of clear space will allow radiation to pass. This process results in the creation of devices on the silicon substrate. This methodology is referred to as photolithography.

A popular method of creating mask patterns involves the use of chrome and is often referred to as chrome on glass (COG). It is recognized however that the methods and systems described herein are equally applicable to all masks that involve light blocking materials and/or attenuated mask systems. In attenuated mask devices, such as attenuated phase shifters and alternating phase shifters, the chrome or other light blocking material is replaced with an attenuating material that allows a small amount of light (e.g., 6%) to pass through and get phase shifted. The materials may include silicon nitride, carbon, thin chrome with an oxide, thin chrome with the clear areas etched, etc.

Unfortunately, the efficacy of all lithography tools is limited by numerous factors, and is especially limited by the resolution of the lens, or reticles, used to direct the radiation through the mask. When a system is being used within its resolution limits, an aerial image of the circuit will be printed onto the chip as desired (i.e., "on size"). However, when the tool is being used aggressively, that is, past the design limits of the tool, certain images will print with a deviation from their desired size. This is referred to as operating in a nonlinear regime. Thus, under certain circumstances, it is not unusual to have polygates deviate from their desired size by as much as 50 nanometers (nm), which is unacceptably high.

There have been numerous attempts at solving this problem including those involving optical proximity corrections. Proximity correction techniques work by modifying the dimensions of the chrome lines on the mask to compensate for the error caused by nonlinear operation. Thus, under this technique, it may be necessary to put a chrome line with a width of 0.95 microns on the mask to print a line with a width of 1.0 microns. However, because a given mask may contain millions of lines of varying dimensions, difficulties arise in providing an efficient and accurate method for calculating line modifications.

To fabricate advanced mask devices, the use of several optical proximity correction techniques are required. These include FIG. 1 which discloses an anchor 10 which is used to prevent line shorting, FIGS. 2 and 3 disclose serifs 11 to better define corners, FIG. 4 discloses a jog 12 to better control line width, and FIGS. 5 and 6 disclose outriggers 13 to improve image size and square. These correction techniques significantly improve wafer lithographic performance, but due to their sub-resolution sizes create a mask challenge to write, inspect, and repair.

Inspection problems using optical proximity correction include Die-to-Data inspection because of the mismatch between the data and the processed image on the mask. (Die-to-Data inspection involves comparing glass representation of a desired image from a computer to images obtained from an inspection tool). The mismatch between the data and the processed image is made worse when optical proximity correction features are added to the mask design. This results in the inspection equipment finding too many false defects. Any attempt to relax the inspection criteria will allow other defects to be missed. Therefore, current Die-to-Data inspection techniques do not allow for accurate Die-to-Data inspection on masks due to process and tool anomalies.

Another inspection problem involves contact-like level masks. Contact-like level masks brings metal connections underneath to a surface above. A problem occurs where the contact shape and area are skewed and do not fall within the defect tolerances of the data, but are still functional.

SUMMARY OF THE PRESENT INVENTION

Disclosed is an adaptive inspection method and system which provide for mask or printed wafer inspection with process and/or tool anomalies that are not consistent with the numerical control data used to write and inspect the masks.

It is therefore an advantage of the present invention that it will allow customized mask inspection capability.

It is a further advantage of the present invention that it will allow for effective inspection of optical proximity correction (OPC) masks.

It is a further advantage of the present invention to increase inspection capability without excessive false detects.

It is a further advantage of the present invention to be able to tailor inspection to the write exposure system.

It is a further advantage of the present invention to be able to tailor inspection to the mask design.

It is a further advantage of the present invention to be able to tailor inspection to the allowable misshapes.

It is a further advantage of the present invention to be able to tailor inspection to the most important defect criteria.

It is a further advantage of the present invention to be able to tailor inspection of different images to different criteria.

It is a further advantage of the present invention to allow uninspectable masks to be inspected and to filter out unimportant differences.

It is a further advantage of the present invention to allow flexibility to inspect any shape independent of data complexity.

It is a further advantage of the present invention to allow fast data handling for repetitive design since the mask process tends to repeat unimportant variations and only a few library images are needed.

It is a further advantage of the present invention to be simple by design.

It is a further advantage of the present invention that it can be tailored to a specific tool or process.

It is a further advantage of the present invention that variations caused by tools or process can be captured and filtered out.

It is a further advantage of the present invention in that it allows for tighter inspection criteria.

It is a further advantage of the present invention not to require loosening of the inspection setting to accommodate unimportant mask variations.

It is a further advantage of the present invention to tailor inspection to customer requirements.

It is a further advantage of the present invention to filter out what is specifically not important to a customer.

DESCRIPTION OF THE PREFERRED EMBODIMENTS

Although certain preferred embodiments of the present invention will be shown and described in detail, it should be understood that various changes and modifications may be made without departing from the scope of the appended claims. The scope of the present invention will in no way be limited to the sizes of constituting components, the materials thereof, the shapes thereof, the relative arrangement thereof, etc. and are disclosed simply as an example of the embodiment. The invention is also not limited by optics, but also applies equally to electrooptics.

The invention includes a system and method that makes un-inspectable designs inspectable by factoring out unimportant differences between the original data and the design images. The design being inspected can be either a mask design or a pattern printed on a wafer.

This invention derives an adaptive inspection method or system that allows for a tighter inspection of a design as compared to a data set and which has repeatable differences. The inspection should allow flexibility to remove un-important differences between the design and the data while maintaining a tight inspection in the following two specific areas: advanced reticles and optical proximity correction (OPC).

Advanced reticles are those where the results require the smallest images (e.g., images below 1 micron). Tight inspection requirements often exceed the mask imagining capability. This results in false inspection defects caused by a misshaped image. Though the misshaped image is acceptable to the customer, de-tuning the inspection to allow such misshaped images is not acceptable. An example of this is the 256 Megabit (MB) contact-like level mask where the contacts are typically nonsymmetrical on the mask and data used to make the images is symmetrical. The present invention allows for a tighter inspection of the contact-like level masks.

Figure 1:
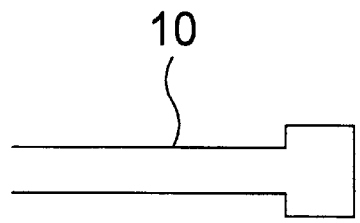
FIG. 1 discloses an OPC technique using an anchor.
Figure 2:
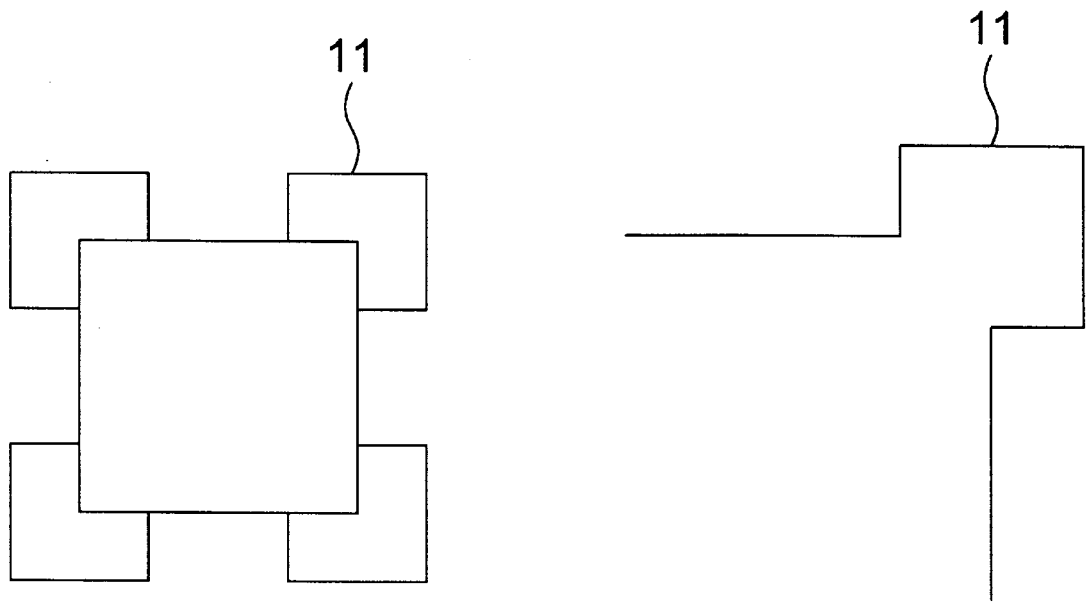
FIGS. 2 and 3 disclose an OPC technique using a serif.
Figure 3:
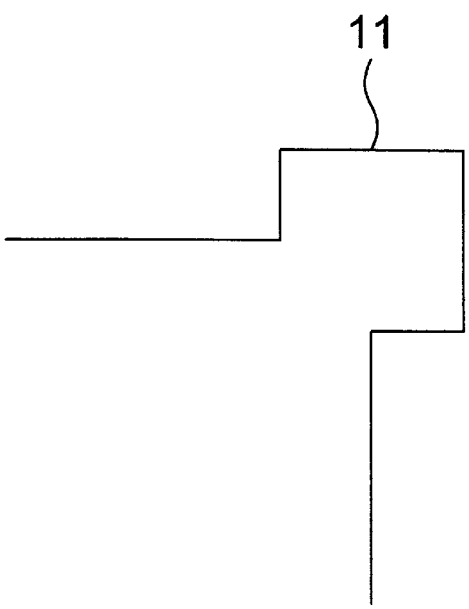
Figure 4:
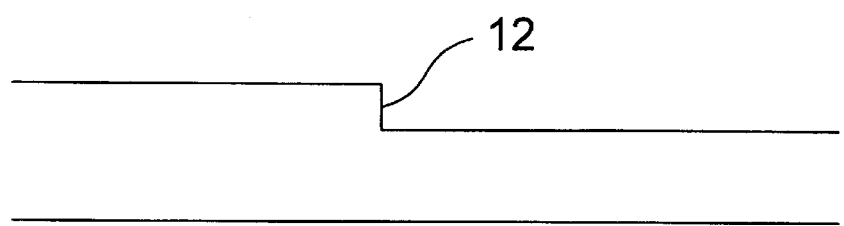
FIG. 4 discloses an OPC technique using a jog.
Figure 5:
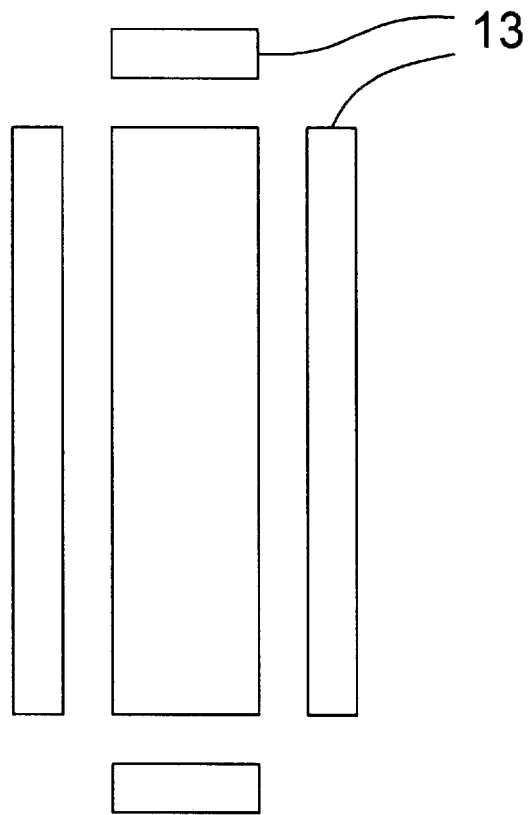
FIGS. 5 and 6 disclose an OPC technique which includes subresolution/assist using an outrigger.
Figure 6:
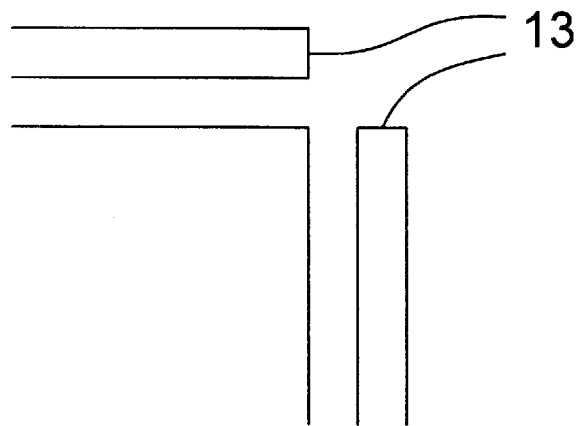
Figure 7:
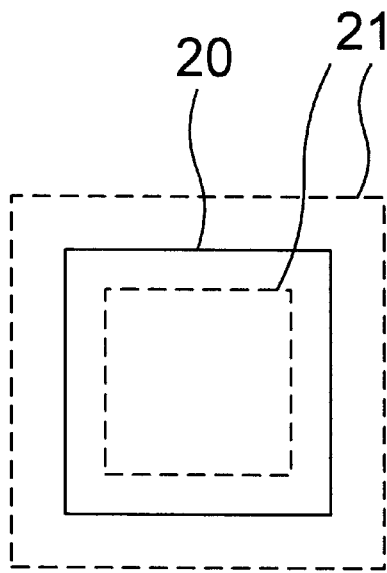
FIG. 7 shows a contact that falls within the inspection limits.
Figure 8:
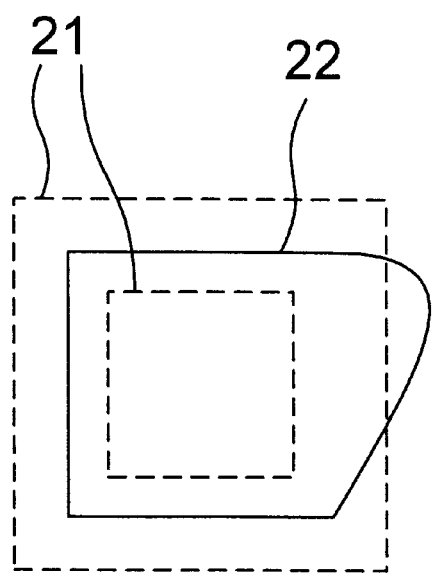
FIG. 8 shows a contact that falls outside the inspection limits.
Figure 9:
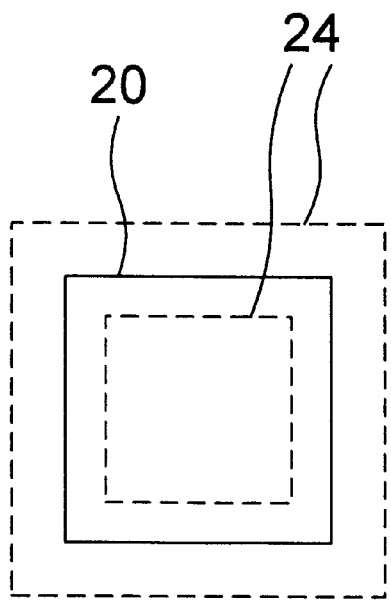
FIG. 9 shows a contact that falls within the inspection limits.
Figure 10:
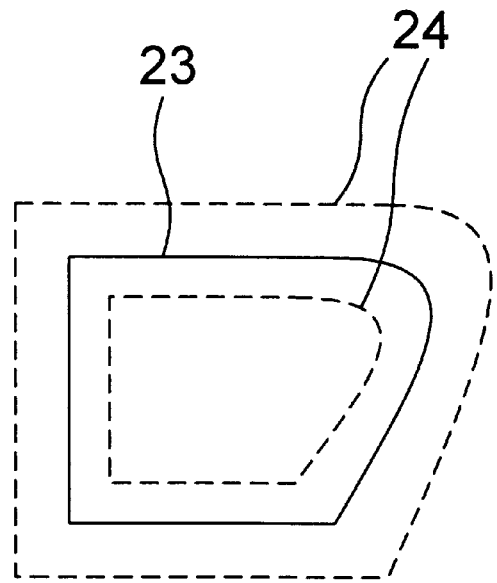
FIG. 10 shows a distorted contact which is an example of a false defect because it still falls within the acceptable limits of the design criteria.

In accordance with the present invention, the contacts should pass inspection to specified inspection criteria. FIG. 7 shows a contact 20 that meets the inspection criteria. The contact 20 falls within the inner and outer dimensions of the inspection tolerances or guardbands 21 which set the limits for an acceptable contact. FIG. 8 shows a contact 22 which falls outside the guardband and would register as a defect. However, if the shape of the contact is unimportant this would be a false defect. False defects are defects that do not meet the design tolerances, but also do not effect the performance of the circuits. FIG. 9 shows a contact or design 20 with inspection limits 24. FIG. 10 shows a contact 23 with a shape which is a mask image systematic error which goes beyond specifications, but is still good because the design criteria or inspection limits 24 are such that area and placement are much more important than shape. This shape would be an example of a false defect. False defects are shapes that would not make the mask uninspectable, but will interrupt automatic inspection of the mask. Since the excessive false defect stops make the mask uninspectable, it has been discovered in accordance with the present invention that you have to relax inspection criteria beyond mask inspection specification.

Optical Proximity Correction involves the correction of projection printing errors at the masks involving the use of small images which alter the projected shapes. These small images are below the projected resolution which stresses the mask making resolution. These small images create mismatches between the original design data and the mask fabricated. While the images are critical, the exact shape on the mask is not. The invention allows the inspection of the optical proximity correction features, though they do not match the original data set.

Figure 11:
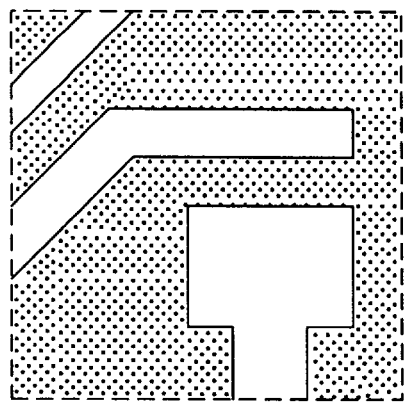
FIG. 11 discloses the desired wafer result.
Figure 12:
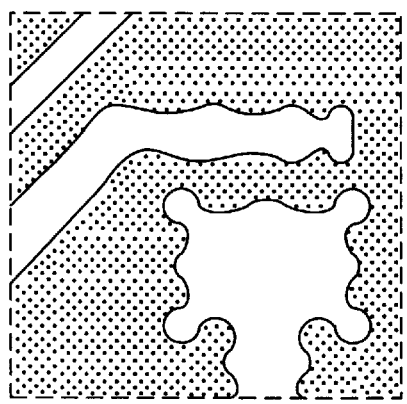
FIG. 12 discloses a mask result.
Figure 13:
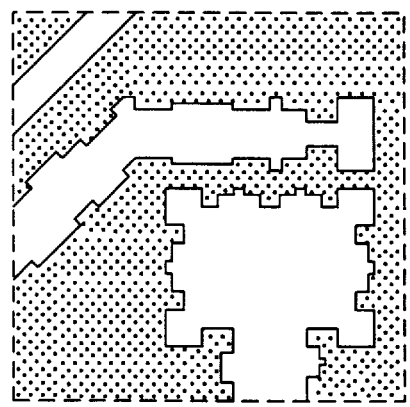
FIG. 13 discloses an OPC corrected mask.

FIG. 11 shows the desired wafer result. FIG. 13 shows an OPC mask compared to the actual mask in FIG. 12. The inspection tool cannot inspect the OPC masks due to unimportant differences between the data and the mask image. These unimportant differences cause excessive false defect stops which either overwhelm the automatic inspection equipment or require too much time to inspect. Although it is important that each small OPC shape is in the design data and that it influences the final shape on the mask, it is not important that the mask precisely matches the data. Therefore, an advantage of the present invention is that it allows the mask to be inspected against the data for important differences or defects.

In the present invention, there will be two types of inspections. The first inspection type is an automatic inspection where the automatic inspection system will inspect and produce a list of potential defect stops, but will not indicate if the stop is an actual defect or a false defect. The second inspection type is a manual inspection by the operator or engineer. The operator will look at a sample of the locations of the stops where the automatic inspection system has identified a potential defect. The operator will go from location to location in the sample looking at the stops. The operator will make a judgment whether the shape will work for the purpose designed. If the operator finds an actual defect, he will note it for repair and continue the inspection. If the operator finds a false defect that is unique or one of a kind, the operator will just move on and continue the manual inspection. If the operator finds "many" of the same type of false defects, then the operator will classify them as a "characteristic false stop." The "characteristic false stop" is a false defect the characteristic of the mask or printed wafer being inspected or characteristic of the process of manufacture.

There are at least four ways that a false defect stop can be judged to be too "many."

First, the automatic inspection system is just overwhelmed or choked by the sheer number of potential defect stops. The system cannot get through inspection of the whole design because there are so many defects that the inspection tool is not able to remember them all. An example of this would be where the automatic inspection system can only get through 10% of the plate or printed wafer and the number of stops exceeds 1,000. The operator would look at a sample to determine if there are repeating false defects stops so that the automatic inspection system can complete the inspection. As an example, in this case, 100 of the same type false stop defects would be considered "many" and would qualify as a characteristic false stop.

Second, the automatic inspection system was able to inspect the entire plate or printed wafer, but would require a very large manual inspection time by the operator to review all of the stops. An example of this would be a single plate or printed wafer with 500 stops and it would take an operator 5 to 6 hours to review the stops. Another example would be plates or printed wafers that are written 30 times a day, but have only 200 or so stops. The review time would also be too much. This case would also require a very limited number of false stop defects to qualify as characteristic false stop.

Third, producing a very "expensive" plate or printed wafer with only 200 or so stops, but it is happening to 3 or 4 plates or printed wafers a day. This would also be excessive and it would also require a very limited number of few false stop defects to qualify as "many" and therefore be judged to be a characteristic false stop.

Fourth, the manufacturing process is producing the false defect and it is happening almost every time a plate or printed wafer is made. Because of the sheer repetitiveness of the false defect it would qualify as a characteristic false stop.

Therefore, the present invention will require the operator's intervention to override the automatic inspection judgment that the shape deviation is a failure and designate the false defects that qualify as "many" stops as "characteristic false stops." The present invention will store the deviant shape with other images in an updatable library and may give the deviant shapes a design tolerance limit of, for example, ±10%.

Figure 14:
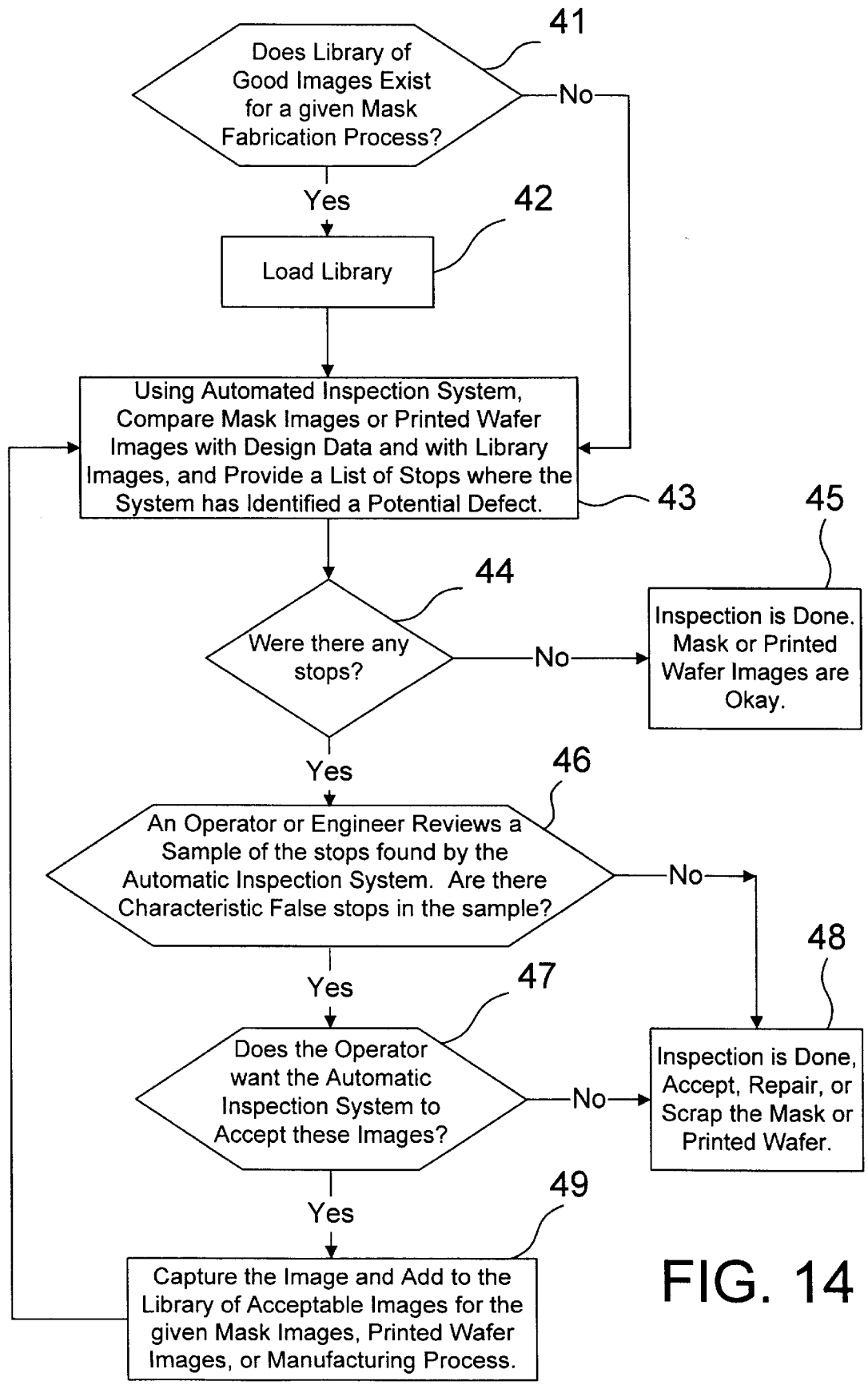
FIG. 14 discloses a flowchart of the present invention.

Referring to FIG. 14, there is a shown a flowchart of a design inspection system in accordance with the preferred embodiment of this invention. As previously discussed, the design can be a printed wafer or an OPC and contact-like level mask. Also as discussed above, the system allows for false defects when the design is being inspected. The first step involves determining whether a library of good images exist for a given mask fabrication process 41. If yes, the next step is to load the updatable library 42. If a library of good images does not exist, then go right to step 43.

Step 43 involves actually inspecting the mask using an automatic inspection system. The inspection of the mask or printed wafer in step 43 includes both the comparison of the mask or printed wafer images to the design data and a comparison to the library of images if there are images in the library. This comparison can occur in sequence or simultaneously. The automatic inspection system will provide a list of stops where the system has identified a potential defect. The automatic inspection system does not know if the potential defect is an actual defect or if it is a false defect.

Step 44 determines whether the inspection system has stops. If no, then the inspection is completed and the mask images or printed wafer images are okay 45. If the inspection has stops, the next step 46 is for the operator or engineer to review a sample of the stops found by the automatic inspection system and determine if there are characteristic false stops in the sample. If no characteristic false stops, then go to step 48. In step 48, the inspection is done and the operator or engineer decides whether to accept, repair, or scrap the mask or printed wafer. If there are characteristic false stops, then go to step 47. In step 47, the operator decides if he wants the automatic inspection system to accept the images of these characteristic false stops. If no, then go to step 48. If yes, then go to step 49. Step 49 involves the capture of the characteristic false stop images and the addition to the updatable library of acceptable images for the given mask images, printed wafer images, or manufacturing process. The next step is to go to step 43 and re-inspect using the updated library. The steps will be repeated as many times as necessary to make a final determination on the mask.

Note that the updatable library may contain images of characteristic false stops, design data, printed wafers, or captured images of the mask being inspected or another mask. The updatable library also can contain any image generated by an algorithm, simulation, or other mathematical method.

We claim:

1. A method of inspecting a design, comprising the steps of:
   a) providing a design having design tolerances;
   b) providing an updatable library of acceptable deviations from the design tolerances which are updatable during an inspection;
   c) inspecting the design and comparing the design with the design tolerances and the updatable library;
   d) accepting the design if the design meets either the design tolerances or the library of acceptable deviations;

e) providing a list of stops where the system has identified potential defects;

f) reviewing a sample of the stops manually to determine if the stops are characteristic false stops; and g) capturing the characteristic false stops and adding them to the updatable library.

2. The method of claim 1, wherein the design is either a mask design or a pattern printed on a wafer.

3. The method of claim 1, wherein the design is a mask design which includes optical proximity correction (OPC).

4. The method of claim 1, wherein the design is a contact-like level mask.

5. The method of claim 1, wherein the updatable library comprises captured images of the design being inspected or of another design.

6. The method of claim 1, wherein the updatable library can be updated by adding additional acceptable deviations.

7. The method of claim 1, wherein the updatable library contains images generated by an algorithm, simulation, or other mathematical method.

8. A method of inspecting a design, comprising the steps of:

a) inspecting a design by comparing the design to design tolerances and an updatable library;

b) providing a list of stops where the system has identified potential defects;

c) reviewing a sample of the stops manually to determine if the stops are characteristic false stops; and d) capturing the characteristic false stops and adding them to the updatable library.

9. The method of claim 8, further comprising:

d) repeatedly inspecting the design by comparing the design to the design tolerances and the updatable library.

10. A method of inspecting a design, comprising the steps of:

a) providing design tolerances and an updatable library;

b) automatically inspecting the design and comparing the design with the design tolerances and the updatable library to determine if there are any potential defect stops;

c) ending the inspection if there are no potential defect stops;

e) manually inspecting the potential defect stops to determine if they are characteristic false stops;

f) ending the inspection if the potential defect stops are not characteristic false stops; and g) adding the characteristic false stops to the updatable library.

11. The method of claim 10, further comprising:

h) repeating steps (b)–(g) until the inspection is ended.

12. The method of claim 11, wherein the inspection is performed in Die-to-Data mode.

13. The method of claim 11, wherein the design includes anchors, outriggers, jogs, or serifs.

14. The method of claim 11, wherein the design is a contact-like level mask.

15. The method of claim 11, wherein the inspection involves OPC inspections.

16. A method for adaptive inspection of a design comprising the steps of:

a) providing a design having design tolerances:

b) providing an updatable library of acceptable deviations from the design tolerances:

c) inspecting the design and comparing the design with the design tolerances and the updatable library;

d) accepting the design if the design meets either the design tolerances or the library of acceptable deviations;

e) if the design fails to meet either the design tolerances or the library of acceptable deviations, producing a list of potential defect stops;

f) reviewing the potential defect stops manually to determine if the potential defect stops are characteristic false stops;

g) if characteristic false stops are not found, then inspection is done;

h) if characteristic false stops are found, add characteristic false stops to the updatable library; and i) repeating steps (c)–(h) until the inspection is done.

17. An adaptive inspection system comprising:

a design having design tolerances;

an updatable library of acceptable deviations from the design tolerances;

means for inspecting the design and comparing the design to the design tolerances and the updatable library to determine if there are any potential defect stops;

means for manually inspecting the potential defect stops to determine if they are characteristic false stops;

means for ending the inspection if the potential defects stops are not characteristic false stops; and means for adding the characteristic false stops to the updatable library.

18. The adaptive inspection system of claim 17, further comprising:

means for repeating the inspection steps until the inspection is ended.

* * * * *